US012688557B2

(12) United States Patent
Li et al.

(10) Patent No.: US 12,688,557 B2
(45) Date of Patent: Jul. 21, 2026

(54) EXTENDED U-NET FOR MULTI-INFORMATION EXTRACTION AND APPLICATION METHOD THEREOF IN LOW-DOSE X-RAY IMAGING

(71) Applicant: Shantou Institute of Ultrasonic Instruments Co., Ltd., Shantou (CN)

(72) Inventors: Delai Li, Shantou (CN); Liexiang Fan, Shantou (CN); Liwei Chen, Shantou (CN); Haomiao Qiu, Shantou (CN); Bin Li, Shantou (CN); Shaowu Zhao, Shantou (CN); Yu Wang, Shantou (CN); Zhonghong Wu, Shantou (CN); Peifeng Chen, Shantou (CN)

(73) Assignee: Shantou Institute of Ultrasonic Instruments Co., Ltd., Shantou (CN)

( * ) Notice: Subject to any disclaimer, the term of this patent is extended or adjusted under 35 U.S.C. 154(b) by 197 days.

(21) Appl. No.: 18/808,393

(22) Filed: Aug. 19, 2024

(65) Prior Publication Data
US 2024/0412336 A1 Dec. 12, 2024

Related U.S. Application Data

(63) Continuation of application No. PCT/CN2022/090475, filed on Apr. 29, 2022.

(30) Foreign Application Priority Data

Apr. 24, 2022 (CN) .......................... 202210454422.0

(51) Int. Cl.
$G06T\ 5/60$ (2024.01)
$A61B\ 6/00$ (2024.01)
(Continued)

(52) U.S. Cl.
CPC .............. $G06T\ 5/60$ (2024.01); $G06T\ 3/4046$ (2013.01); $G06T\ 5/70$ (2024.01);
(Continued)

(58) Field of Classification Search
CPC .......... G06T 5/60; G06T 3/4046; G06T 5/70; G06T 2207/10116; G06T 2207/20081; G06T 2207/20084; G06T 2207/30004; G06T 2207/20192; A61B 6/5205; A61B 6/5258; G06N 3/084; G06N 3/045
See application file for complete search history.

(56) References Cited

U.S. PATENT DOCUMENTS

2020/0311490 A1* 10/2020 Lee .......................... G06T 5/60

FOREIGN PATENT DOCUMENTS

CN 113516678 A * 10/2021 ........... G06F 18/241
CN 113870138 A * 12/2021 ............. G06N 3/045

* cited by examiner

*Primary Examiner* — Stephen R Koziol
*Assistant Examiner* — Samuel D Baynes
(74) *Attorney, Agent, or Firm* — Westbridge IP LLC

(57) ABSTRACT

Disclosed are an extended U-Net for multi-information extraction and an application method thereof in low-dose X-ray imaging. The follow technical solution is adopted: expanding the number of output channels in upsampling of a U-Net model, adding a fully connected layer at the end to realize extraction and superposition calculation of multiple information, processing low-dose X-ray images by using the extended U-Net, and taking normalized images, noise and image salient features as outputs for learning and training.

1 Claim, 2 Drawing Sheets

(51) Int. Cl.
 *G06T 3/4046* (2024.01)
 *G06T 5/70* (2024.01)

(52) U.S. Cl.
 CPC ............... *G06T 2207/10116* (2013.01); *G06T 2207/20081* (2013.01); *G06T 2207/20084* (2013.01); *G06T 2207/30004* (2013.01)

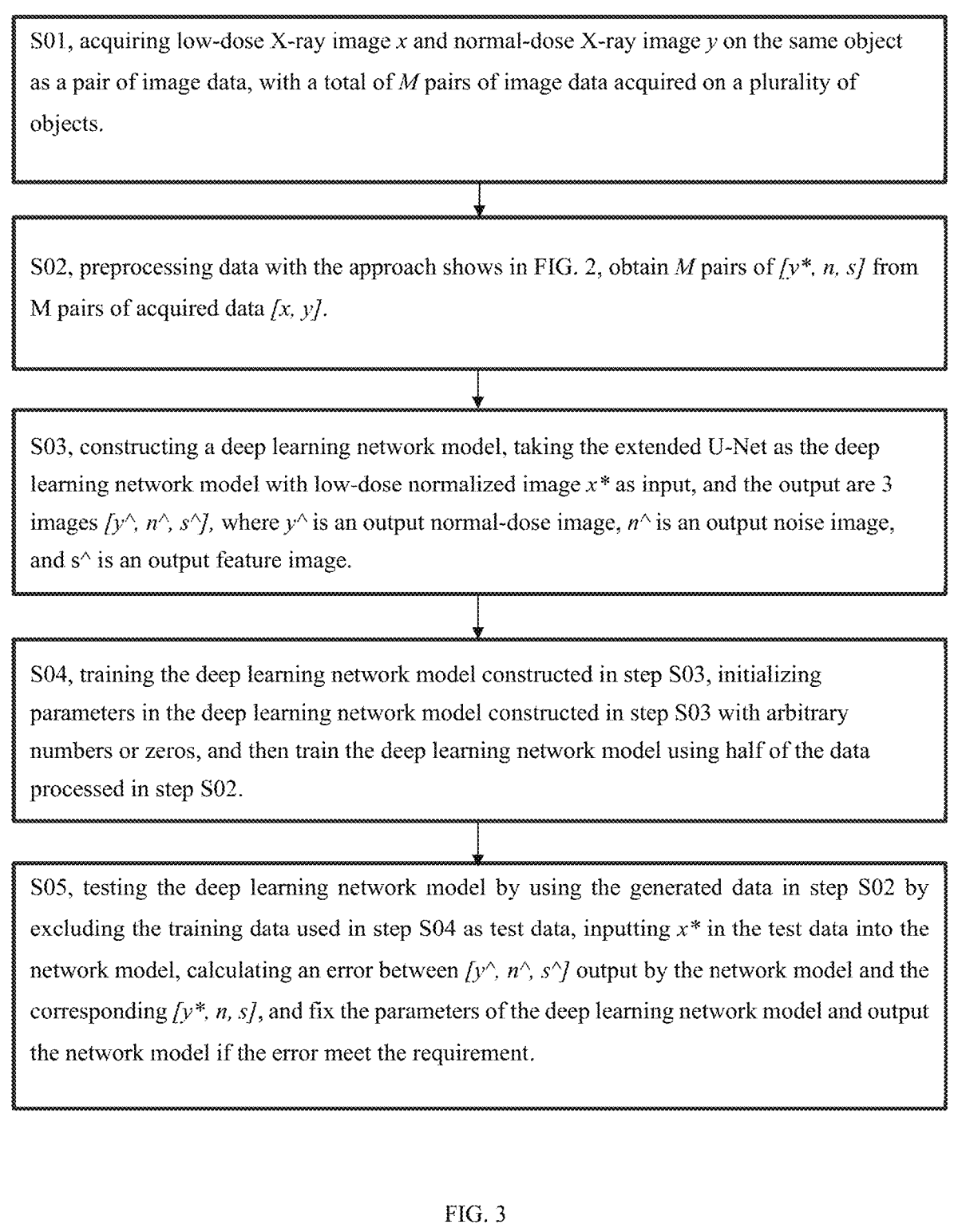

S01, acquiring low-dose X-ray image $x$ and normal-dose X-ray image $y$ on the same object as a pair of image data, with a total of $M$ pairs of image data acquired on a plurality of objects.

S02, preprocessing data with the approach shows in FIG. 2, obtain $M$ pairs of $[y^*, n, s]$ from M pairs of acquired data $[x, y]$.

S03, constructing a deep learning network model, taking the extended U-Net as the deep learning network model with low-dose normalized image $x^*$ as input, and the output are 3 images $[y^\wedge, n^\wedge, s^\wedge]$, where $y^\wedge$ is an output normal-dose image, $n^\wedge$ is an output noise image, and $s^\wedge$ is an output feature image.

S04, training the deep learning network model constructed in step S03, initializing parameters in the deep learning network model constructed in step S03 with arbitrary numbers or zeros, and then train the deep learning network model using half of the data processed in step S02.

S05, testing the deep learning network model by using the generated data in step S02 by excluding the training data used in step S04 as test data, inputting $x^*$ in the test data into the network model, calculating an error between $[y^\wedge, n^\wedge, s^\wedge]$ output by the network model and the corresponding $[y^*, n, s]$, and fix the parameters of the deep learning network model and output the network model if the error meet the requirement.

FIG. 3

EXTENDED U-NET FOR MULTI-INFORMATION EXTRACTION AND APPLICATION METHOD THEREOF IN LOW-DOSE X-RAY IMAGING

CROSS-REFERENCE TO RELATED APPLICATIONS

The present application is a continuation application of International Application No. PCT/CN2022/090475, filed on Apr. 29, 2022, which claims priority to Chinese Patent Application No. 202210454422.0, filed on Apr. 24, 2022. All of the aforementioned applications are incorporated herein by reference in their entireties.

TECHNICAL FIELD

The application relates to the technical field of X-ray imaging, in particular to an extended U-Net for multi-information extraction and an application method thereof in low-dose X-ray imaging.

BACKGROUND

The noise level of X-ray imaging is inversely proportional to the square root of X-ray intensity, which is the higher the intensity of X-ray imaging, the lower the noise level of imaging and the clearer the images. However, too much X-ray intensity may cause severe harms to human bodies. Therefore, the study of X-ray imaging tends to minimize the dose of X-ray and ensure the clarity of low-dose X-ray imaging, so as to ensure X-ray images obtained meet diagnostic requirements. In order to make low-dose X-ray images meet diagnostic requirements, processing to noise and interference of low-dose X-ray images is required. Conventional image processing can reduce image noise to a certain extent by filtering low-dose X-ray images, which has low performance in noise reduction.

In recent years, with the development of deep learning networks, noise reduction methods based on deep learning are proposed to improve the quality of low-dose X-ray images. There are two main methods.

One method is to map low-dose X-ray images and normal-dose X-ray images. Take low-dose images as the input and normal-dose images as labeled images for learning to achieve noise reduction of the low-dose images. In this way, the noise in the low-dose images is eliminated in the network model, which is an implicit processing method. It has a disadvantage that it is not easy to effectively control the maintenance of salient features such as image contouring during image reconstruction. Furthermore, the implicit processing method needs massive amount of data for training, which takes a long and costly sampling process, and the X-ray is harmful to human bodies. Additional X-ray images of patients collected for training should be reduced as much as possible.

Another method is to map low-dose images and noise images to achieve noise reduction of the low-dose images. Take noise images as the output. By excluding noise images from low-dose images, images approximate to normal dose are obtained. If the noise output result itself leads to a certain error, it is easy to have new inhomogeneity and black holes in the images when subtraction is carried out, and the signal to noise ratio in low-dose images is poor. Thus contour information whose signal intensity close to the noise level might be easily undermined in the subtraction.

SUMMARY

The application aims to provide a U-Net for multi-information extraction and an application method thereof in low-dose X-ray imaging, so as to improve noise reduction processing performance of low-dose X-ray images.

In order to achieve the objective above, the follow technical solution is adopted: an extended U-Net for multi-information extraction by downsampling the input image data several times from the U-Net model, after two convolutional layer operations and then the same number of upsampling as that of downsampling, finally adding a fully connected layer to the end of upsampling to increase the number of channels for image data output exponentially, with the multiple increase in the number of channels equal to the number of types of output labeled images; Each downsampling comprises two convolution operations+pooling operation, and each downsampling comprises inverse pooling operation+image data before splicing pooling operation at the same level+two convolution operations.

Specifically, the pooling operation in downsampling adopts maximum pooling operation.

Specifically, the inverse pooling operation in upsampling adopts inverse average pooling operation.

An extended U-Net for multi-information extraction and an application method thereof in low-dose X-ray imaging comprises the following steps:

S01, acquiring a pair of image data (x,y) by carrying out low-dose and normal-dose X-ray image data acquisition on the same object, wherein x represents low-dose image data and y represents normal-dose image data, and acquiring multiple pairs of image data from a plurality of objects, with a total of M pairs of image data acquired;

S02, preprocessing data, wherein the acquired M pairs of image data are processed as follows: normalizing low-dose image data x and normal-dose image data y with respect to the maximum amplitude value to obtain a low-dose normalized image x* and a normal-dose normalized image y*; excluding the low-dose normalized image x* from the normal-dose normalized image y* to obtain a noise image n, n=y*−x*; extracting significant features from the normal-dose normalized image y* to obtain a featured image s, s=f(y*), wherein f( ) is an arithmetic function of feature extraction;

S03, constructing a deep learning network model, taking the extended U-Net as the deep learning network model, the low-dose normalized image x* as an input, and outputting three types of labeled images, namely [ŷ, n̂, ŝ], wherein ŷ is an output normal-dose image, n̂ is an output noise image, and ŝ is an output featured image;

S04, training the deep learning network model constructed in step S03, initializing parameters in the deep learning network model constructed in step S03 with arbitrary numbers or zeros, and then using half of the data processed in step S02 as training data to train the deep learning network model; The training process specifically comprises the following steps: taking the low-dose normalized image x* in training data as an input of the network model; adjusting parameters of the network model through a backpropagation mechanism by using difference values of three types of labeled images [ŷ, n̂, ŝ] output by the network model that correspond to [y*, n, s] in the training data; calculating and outputting again after adjustment and iterating for a plurality of times; and ending the iteration process when the difference values of the output [y^, n^, s^] and [y*, n, s] of the network model comply with certain conditions; and S05, testing the deep learning network model by using the generated data in step S02 by excluding the training data used in step S04 as test data, inputting x* in the test data into the deep learning network model, calculating an error between [y^, n^, s^] output by the network model and the corresponding [y*, n, s], and if the error [y*−y^, n−n^, s−s^] is less than a set range, the performance of the deep learning network model meets the requirement. Fix parameters of the deep learning network model and output the network model.

Specifically, the objects for data acquisition in step S01 comprise a quality control test block, a human-mimicking phantom, animals and humans.

The application has the beneficial effects to provide an extended U-Net network model that explicitly differentiates signals, image features and noise in low-dose X-ray images, whose data are effective weighted in the training process, enabling the three items of different types of data gradually divided and mutually verified in the operation of the network model, thereby effectively improving the noise reduction performance of the low-dose X-ray images.

BRIEF DESCRIPTION OF THE DRAWINGS

FIG. 3 illustrates a flowchart of an extended U-Net for multi-information extraction in an application process of low-dose X-ray imaging in the embodiment.

DETAILED DESCRIPTION OF THE EMBODIMENTS

Figure 1:
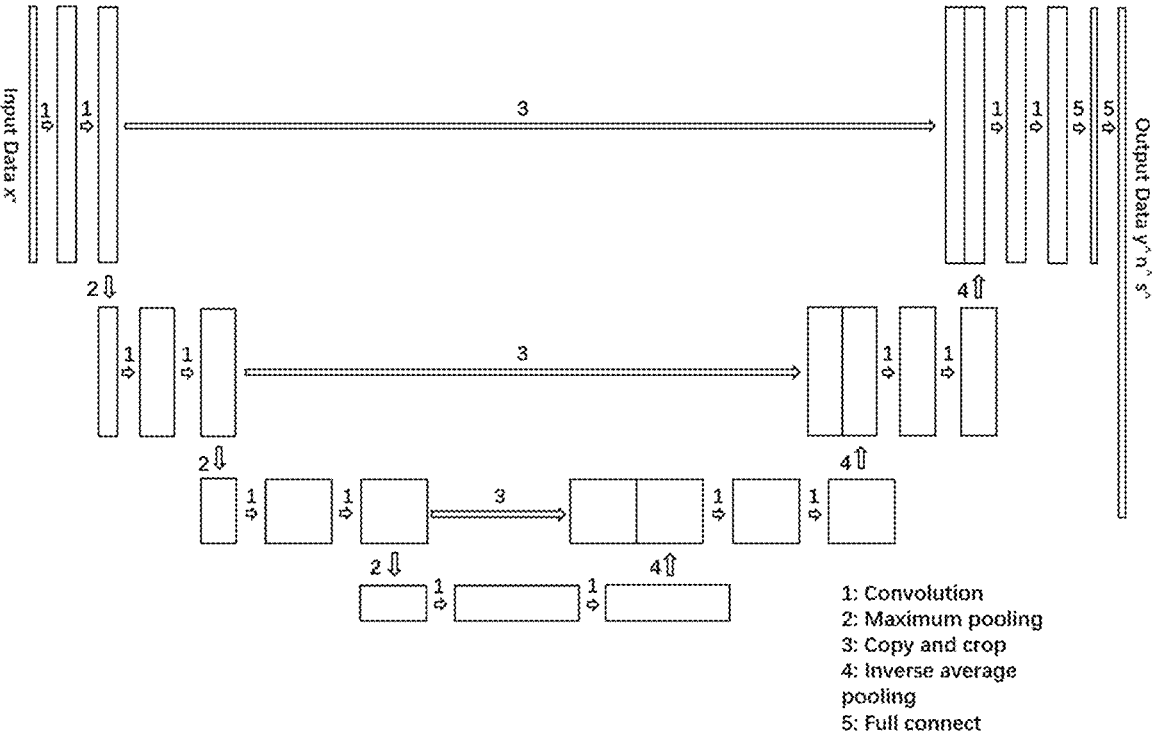
FIG. 1 illustrates a schematic diagram of an extended U-Net for multi-information extraction in an application process of low-dose X-ray imaging according to an embodiment.
Figure 2:
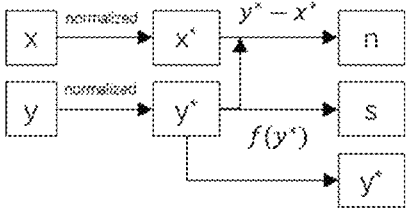
FIG. 2 illustrates a flowchart of the data preprocessing approach of an extended U-Net for multi-information extraction in an application of low-dose X-ray imaging.

In Embodiment 1, referring to FIG. 1, the embodiment provides an extended U-Net for multi-information extraction, in which the U-Net model firstly downsamples input image data for multiple times, performs two convolution layer operations, then upsamples for the same number of times as that of downsampling, and finally adds a fully connected layer at the end of the upsampling to multiply the number of channels of output image data, and the multiple of the increase in the number of channels is equal to the number of types of output labeled images.

Each downsampling comprises two convolution operations+pooling operations, and each downsampling comprises inverse pooling operations+splicing image data before the same level pooling operations+two convolution operations. The pooling operation in downsampling adopts maximum pooling operation; the inverse pooling operation in upsampling adopts inverse average pooling operation.

The U-Net model is characterized in that a fully connected layer is added at the end of upsampling according to the number of types of output labeled images to expand the number of channels of output images, so that multi-information extraction of the input images is realized; the number of channels of the output images is expanded through the fully connected layer, and images of multiple types of information can be output, so that multiple information can be extracted and mutually verified in the operation of image data in the network model to achieve a good image processing effect.

This embodiment utilizes the extended U-Net described above to provide an application method of the extended U-Net for multi-information extraction in low-dose X-ray imaging, comprising the following steps:

S01, acquiring a pair of image data (x,y) by carrying out low-dose and normal-dose X-ray image data acquisition on the same object, wherein x represents low-dose image data and y represents normal-dose image data, and acquiring multiple pairs of image data from a plurality of objects, with a total of M pairs of image data acquired; In the process of data acquisition, the objects of data acquisition comprise a quality control test block, a human-mimicking phantom, animals and humans. In order to reduce the harm to humans, the amount of data collected from humans should be minimized as much as possible, at least lower than the data acquisition amount from objects of the other three types;

S02, preprocessing data, wherein the acquired M pairs of image data are processed as follows: normalizing low-dose image data x and normal-dose image data y with respect to the maximum amplitude value to obtain a low-dose normalized image x* and a normal-dose normalized image y*; excluding the low-dose normalized image x* from the normal-dose normalized image y* to obtain a noise image n, $n=y*-x*$; extracting significant features from the normal-dose normalized image y* to obtain a featured image s, $s=f(y*)$, wherein $f( )$ is an arithmetic function of feature extraction. For example, using a high-pass filter processing function to extract salient features, or adjusting the feature extraction function according to the actual requirement;

S03, constructing a deep learning network model, taking the extended U-Net as the deep learning network model, the low-dose normalized image x* as an input, and outputting three types of labeled images, namely [y^, n^, s^], wherein y^ is an output normal-dose image, n^ is an output noise image, and s^ is an output featured image;

S04, training the deep learning network model constructed in step S03, initializing parameters in the deep learning network model constructed in step S03 with arbitrary numbers or zeros, and then using half of the data processed in step S02 as training data to train the deep learning network model; The training process specifically comprises the following steps: taking the low-dose normalized image x* in training data as an input of the network model; adjusting parameters of the network model through a backpropagation mechanism by using difference values of three types of labeled images [y^, n^, s^] output by the network model that correspond to [y*, n, s] in the training data; calculating and outputting again after adjustment and iterating for a plurality of times; and ending the iteration process when the difference values of the output [y^, n^, s^] and [y*, n, s] of the network model comply with certain conditions. In the deep learning network model of this embodiment, not only taking the normal-dose normalized image y* as the object of learning and training, but also incorporating the noise image n generated by excluding the low-dose normalized image x* from the normal-dose normalized image y* and salient-feature images of the normal-dose normalized image y* as the object of learning and training, which effectively improves the noise reduction processing effect on low-dose images, and improves the processing effect of low-dose X-ray images while ensuring the clarity of image boundary at the same time;

S05, testing the deep learning network model by using the generated data in step S02 by excluding the training data used in step S04 as test data, inputting x* in the test data into the deep learning network model, calculating an error between [yˆ, nˆ, sˆ] output by the network model and the corresponding [y*, n, s], and if the error [y*−yˆ, n−nˆ, s−sˆ] is less than a set range, the performance of the deep learning network model meets the requirement. Fix parameters of the deep learning network model and output the network model.

Certainly the embodiments above are preferred for the present application only, but not intended to restrict the scope of use of the present application. Therefore, any equivalent changes made on the principles of the present application should be included in the protection scope of the present application.

What is claimed is:

1. An application method of an extended U-Net for multi-information extraction in low-dose X-ray imaging, wherein the extended U-Net for multi-information extraction comprises following steps: downsampling input image data several times from the U-Net model firstly, after two convolutional layer operations and then the same number of upsampling as that of downsampling, finally adding a fully connected layer to the end of upsampling to increase the number of channels for image data output exponentially, with the multiple increase in the number of channels equal to the number of types of output labeled images; each downsampling comprises two convolution operations+pooling operation, and each downsampling comprises inverse pooling operation+image data before splicing pooling operation at the same level+two convolution operations;

wherein the method comprises the following steps:

S01, acquiring a pair of image data (x,y) by carrying out low-dose and normal-dose X-ray image data acquisition on the same object, wherein x represents low-dose image data and y represents normal-dose image data, and acquiring multiple pairs of image data from a plurality of objects, with a total of M pairs of image data acquired;

S02, preprocessing data, wherein the acquired M pairs of image data are processed as follows: normalizing low-dose image data x and normal-dose image data y according to the maximum amplitude value to obtain a low-dose normalized image x* and a normal-dose normalized image y*; excluding the low-dose normalized image x* from the normal-dose normalized image y* to obtain a noise image n, n=y*−x*; extracting significant features from the normal-dose normalized image y* to obtain a featured image s, s=ƒ(y*), wherein ƒ( ) is an arithmetic function of feature extraction;

S03, constructing a deep learning network model, taking any extended U-Net as the deep learning network model, the low-dose normalized image x* as an input, and outputting three types of labeled images, namely [yˆ, nˆ, sˆ], wherein yˆ is an output normal-dose image, nˆ is an output noise image, and sˆ is an output featured image;

S04, training the deep learning network model constructed in step S03, initializing parameters in the deep learning network model constructed in step S03 with arbitrary numbers or zeros, and then using half of the data processed in step S02 as training data to train the deep learning network model; the training process specifically comprises the following steps: taking the low-dose normalized image x* in training data as an input of the network model; adjusting parameters of the network model through a backpropagation mechanism by using difference values of three types of labeled images [yˆ, nˆ, sˆ] output by the network model that correspond to [y*, n, s] in the training data; calculating and outputting again after adjustment and iterating for a plurality of times; and ending the iteration process when the difference values of the output [yˆ, nˆ, sˆ] and [y*, n, s] of the network model comply with certain conditions; and S05, testing the deep learning network model by using the generated data in step S02 by excluding the training data used in step S04 as test data, inputting x* in the test data into the deep learning network model, calculating an error between [yˆ, nˆ, sˆ] output by the network model and the corresponding [y*, n, s], and when the error [y*−yˆ, n−nˆ, s−sˆ] is less than a set range, the performance of the deep learning network model meets the requirement, fix parameters of the deep learning network model and output the network model.

* * * * *